UNITED STATES PATENT OFFICE.

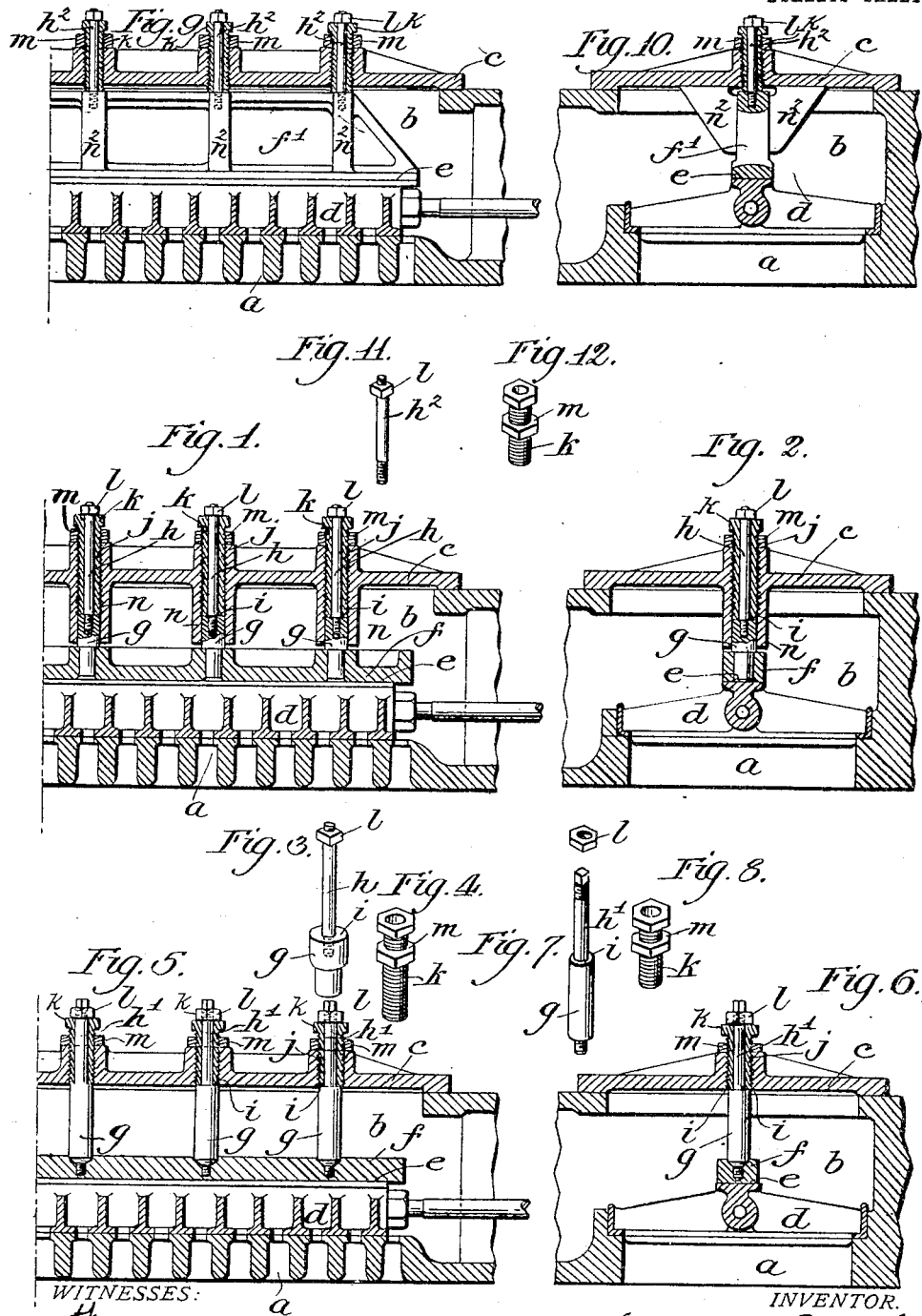

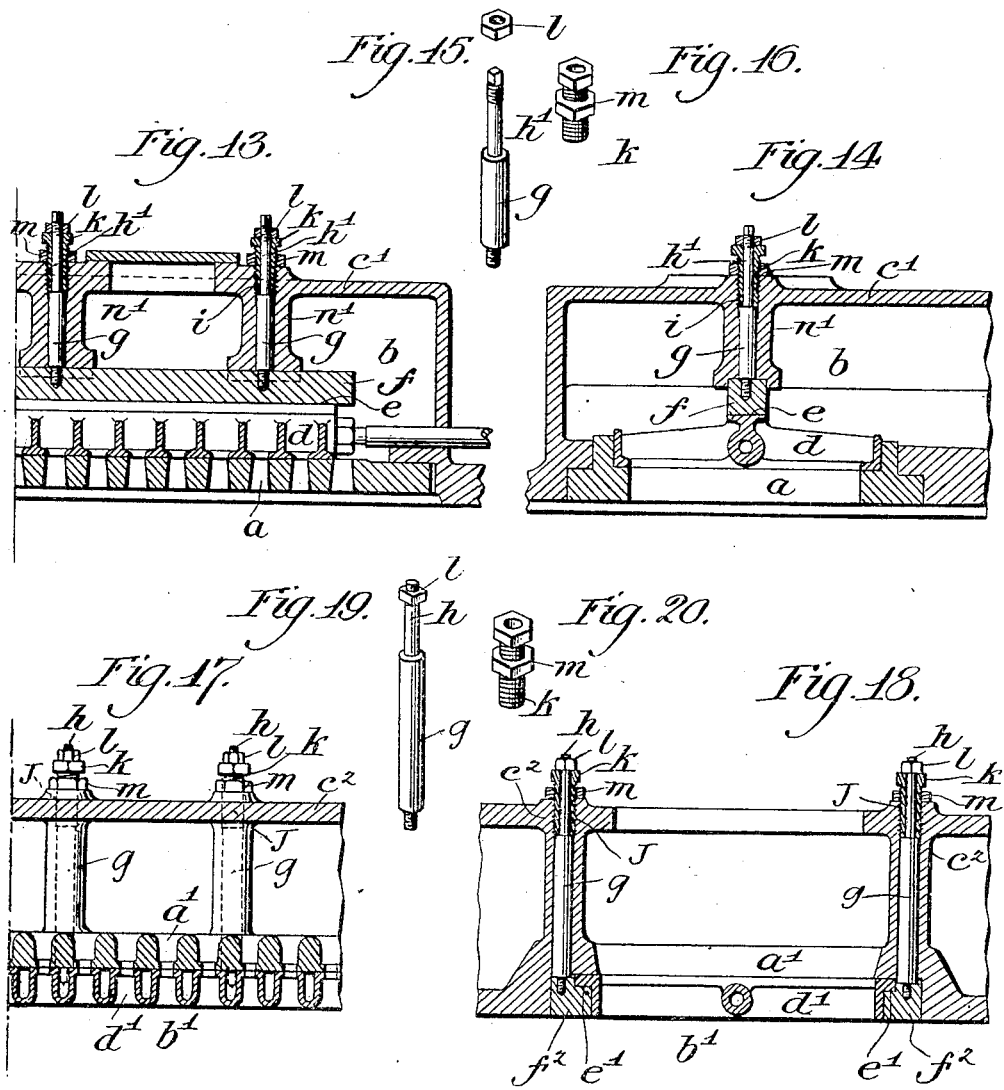

GUSTAV BERNHARD PETSCHE, OF PHILADELPHIA, PENNSYLVANIA, ASSIGNOR TO SOUTHWARK FOUNDRY & MACHINE COMPANY, OF PHILADELPHIA, PENNSYLVANIA, A CORPORATION OF PENNSYLVANIA.

ADJUSTABLE BEARING FOR VALVES.

No. 926,762.      Specification of Letters Patent.      Patented July 6, 1909.

Application filed May 13, 1903. Serial No. 156,937.

*To all whom it may concern:*

Be it known that I, GUSTAV BERNHARD PETSCHE, a subject of the Emperor of Germany, residing in the city and county of Philadelphia, in the State of Pennsylvania, have invented a certain new and useful Improvement in Adjustable Bearings for Valves, of which the following is a true and exact description, reference being had to the accompanying drawings, which form a part thereof.

My invention relates to the construction of adjustable back bearings for sliding valves and has for its object, particularly, to provide means for adjusting such bearings, inclosed in a closed chamber, from the outside of said chamber, and also to improve the character of the back bearings and of the means for adjusting them.

The nature of my improvements will be best understood as described in connection with the drawings which illustrate it in various modifications, and in which—

Figure 1, is a central longitudinal section through the delivery valve of a blowing engine and through the back bearing of said valve and its adjusting mechanism. Fig. 2, is a cross-sectional view of the parts shown in Fig. 1. Fig. 3, is a perspective view of one of the guides and bolts shown in Fig. 2. Fig. 4, is a separate perspective view of one of the sleeve bolts, shown in Figs. 1 and 2. Fig. 5, is a central longitudinal section through a modified construction of delivery valve bearing connections. Fig. 6, a cross-sectional view of the parts shown in Fig. 5. Figs. 7, and 8, are perspective views of the adjusting bolts of Figs. 5 and 6. Figs. 9, and 10, are longitudinal and cross-sectional views of another modification. Figs. 11 and 12, perspective views of the adjusting bolts of Figs. 9, and 10. Figs. 13, and 14, are longitudinal and cross-sectional views of still another modification. Figs. 15, and 16, are perspective views of the adjusting bolts of Figs. 13 and 14. Figs. 17, and 18, are longitudinal and cross-sectional views showing the application of certain features of my invention to the admission valve of a blowing engine. Figs. 19, and 20, are perspective views of the adjusting bolts of Figs. 17 and 18.

$a$, (Figs. 1, 2, 5, 6, 9, 10, 13 and 14), indicates the seat and ports for the delivery valve of a blowing engine, the said ports opening into the receiver chamber $b$, of the engine; $c$, indicating the outer removable cover of said chamber which faces the valve seat, and $c'$, in the modification of Figs. 13 and 14, indicating a fixed part of the outer wall of chamber $b$, occupying the same position as cover $c$, with regard to the seat $a$.

$d$, is the delivery valve working on seat $a$, and having in the figures mentioned, a centrally located longitudinal rear face $e$, against which rests the single back bearing $f$, of Figs. 1, etc., or $f'$, of Figs. 9 and 10.

$g$, $g$, etc., indicate studs secured to and projecting from the back of the bearings $f$, and from which project the bolts $h$, of Figs. 1, 2, and 3, which are separate from but secured to the studs, or the bolts $h'$, of Figs. 5 and 6 or 13, and which are formed integral with the studs $g$, but otherwise similar, except in proportions, to the construction first noted. In all cases noted, a shoulder $i$, is formed at the head of studs $g$, but in Figs. 9 and 10, where the deep bearing $f''$, is used, the stud $g$, is omitted and unshouldered bolts $h^2$, extend from said bearing.

$j$ $j$, etc., indicate threaded perforations formed in the cover $c$, or outer wall $c'$, opposite to the points on the back bearings from which the studs $g$, or bolts $h$, extend.

$k$, $k$, etc., are sleeve bolts, screwing into the threaded perforations $j$.

$l$, $l$, etc., are nuts screwing on the ends of the bolts $h$, etc.

$m$, $m$, etc., are lock nuts on bolts $k$.

$n$, $n$, etc., Figs. 1 and 2, are cylindrical bosses extending inward from cover $c$, and fitting on the studs $g$.

$n'$, $n'$, etc., Figs. 13 and 14, are bosses extending inward like bosses $n$, but having their ends provided with ribs which embrace the back bearing as shown, and $n^2$, $n^2$, Figs. 9 and 10, are guide ribs which extend from cover $c$, and abut against the sides of back bearing $f'$.

In Figs. 17, and 18, which show the invention as applicable to the admission valve, $a'$, indicates the valve seat which faces the inside of the cylinder indicated at $b'$; $c^2$, indicating the outer wall of the cylinder having perforations formed in it for the bolts, as indicated at $j$. $d'$, is the valve, having, in this modification, bearing surfaces $e'$, $e'$, at its edges for the back bearings, here indicated at $f^2$, $f^2$. The studs $g$, bolts $h$, and $k$, and nuts $l$, and $m$, shown in these figures do not differ materially from those before described.

In all the modifications illustrated, save those of Figs. 9, and 10, the sleeve bolts *k*, screw against the shoulders *i*, of the bolts *g*, *h*, or their equivalents, and thus form abutments which determine the position of the back bearing or bearings for the valve.

In Figs. 9 and 10, the bolts *k*, abut directly against the back bearing *f''*, which, in this case is deeper than in the others. In practice the bearing is adjusted by loosening the nuts *l*, and *m*, and screwing the sleeve bolts *k*, down against the shoulders *i*, or bearing *f''*, till the back bearing is forced into close contact with the bearing surfaces of the valve. After this is done, the sleeve bolts are turned backward for a distance which will leave a proper clearance between the valve and its bearing, and the nuts *l*, are screwed down on bolts *h*, against the head of bolts *k*, drawing the back bearings attached to bolts *h*, up hard against the sleeve bolts, which, by direct abutment or through shoulders *i*, support it or them. The lock nuts *m*, are of course screwed down against head *c*, to lock the bolts *k*, in position. It will be seen that in all cases the sleeve nuts and bolts *l*, are accessible from the outside of the chamber *b*, or *b'*, inclosing the valve and its back bearing so that the adjustment of the bearing can be made at any time without requiring the chamber to be opened.

The construction illustrated in the figures, other than Figs. 17 and 18, embodies the provision of the single narrow bearing surface *e*, along the center of the valve and the use of the single back bearing, such as *f*, to hold the valve to its seat; this construction is not only less expensive than one requiring two bearings, such as shown in Figs. 17 and 18, but is one which renders the adjustment of the bearing much easier and more satisfactory.

In such constructions as are shown in Figs. 1 to 15, the back bearing, not being steadied by contact with the walls of the chamber, as in Figs. 17 and 18, must be provided with some secure support; a multiple series of studs, as *g, g*, etc., Figs. 5, and 6, may afford such support, but it is preferable to provide additional guides or braces, and in Figs. 1 and 2, I have shown the supporting cylindrical bosses *n, n*, etc., guiding studs *g*, while in Figs. 13 and 14, similar bosses *n'*, are provided with flanges embracing the top of the bearing to prevent its lateral movement, and in Figs. 9 and 10, where the deep bearing *f''*, is employed, guides *n²*, serve the function of guiding the bearing.

Having now described my invention, what I claim as new and desire to secure by Letters Patent is,

1. A grid slide valve, in combination with an adjustable back bearing therefor, a series of bolts secured to said back bearing and having their outer ends threaded, a fixed support having a series of threaded perforations, a series of sleeve bolts screwing in said perforations and through which the bolts secured to the bearing extend, said sleeve bolts serving as abutments for the back bearing, and a series of nuts screwing on the threaded ends of the bolts secured to the bearing and against the ends of the sleeve bolts.

2. A grid slide valve, in combination with an adjustable back bearing therefor, a series of bolts secured to said back bearing, said bolts having shoulders formed on them and having their outer ends threaded, a fixed support having a series of threaded perforations, a series of sleeve bolts screwing in said perforations and through which the bolts secured to the bearing extend, said sleeve bolts abutting against the shoulders of the bolts secured to the bearing, and a series of nuts screwing on the threaded ends of the bolts passing through the sleeve bolts, and against the ends of said sleeve bolts.

3. A grid slide valve, in combination with an adjustable back bearing therefor, a series of bolts secured to said back bearing and having their outer ends threaded, a fixed support having a series of threaded perforations and inwardly extending guides arranged to hold the back bearing against lateral displacement, a series of sleeve bolts screwing in said perforations and through which the bolts secured to the bearing extend, said sleeve bolts serving as abutments for the back bearing, and a series of nuts screwing on the threaded ends of the bolts secured to the bearing and against the ends of the sleeve bolts.

4. A grid slide valve in combination with an adjustable back bearing therefor, a series of bolts secured to said back bearing, said bolts having shoulders formed on them and having their outer ends threaded, a fixed support having a series of threaded perforations and inwardly extending guides arranged to hold the back bearing against lateral displacement, a series of sleeve bolts screwing in said perforations and through which the bolts secured to the bearing extend, said sleeve bolts abutting against the shoulders of the bolts secured to the bearing, and a series of nuts screwing on the threaded ends of the bolts passing through the sleeve bolts, and against the ends of said sleeve bolts.

5. In a blowing engine, the combination of a sliding gridiron air valve having a narrow back bearing face located midway between its side edges and extending parallel to the direction of sliding movement of the valve, in combination with an adjustable back bearing engaging said bearing face only of said valve.

6. A grid slide valve having a central longitudinally running and relatively narrow back bearing face, in combination with an adjustable back bearing arranged to contact with said central face only, a series of bolts secured to said back bearing and having their outer ends threaded, a fixed support having a series of threaded perforations corresponding to the bolts, a series of sleeve bolts screwing into said perforations and through which the bolts secured to the bearing extend, said sleeve bolts serving as abutments for the back bearing, and a series of nuts screwing on the ends of the bolts which extend through the sleeve bolts.

7. A grid slide valve having a central longitudinally running back bearing face, in combination with an adjustable back bearing arranged to contact with said central face, a series of bolts secured to said back bearing, said bolts having shoulders formed on them and having their outer ends threaded, a fixed support having a series of threaded perforations corresponding to the bolts, a series of sleeve bolts screwing into said perforations and through which the bolts secured to the bearing extend, said sleeve bolts abutting against the shoulders of the bolts passing through them, and a series of nuts screwing on the ends of the bolts which extend through the sleeve bolts.

8. A grid slide valve having a central longitudinally running back bearing face, in combination with an adjustable back bearing arranged to contact with said central face, a series of bolts secured to said back bearing and having their outer ends threaded, a fixed support having a series of threaded perforations corresponding to the bolts and inwardly extending guides, arranged to hold the back bearing against lateral displacement, a series of sleeve bolts screwing into said perforations and through which the bolts secured to the bearing extend, said sleeve bolts serving as abutments for the back bearing, and a series of nuts screwing on the ends of the bolts which extend through the sleeve bolts.

9. In an engine having a grid slide valve working in an inclosed chamber, the combination with said slide valve of an adjustable back bearing, a series of bolts secured to said bearing and extending from the valve inclosing chamber through the outer wall thereof, said bolts having their outer ends threaded, a series of threaded perforations formed in the outer wall of the valve inclosing chamber through which the bolt ends aforesaid pass loosely, a series of sleeve bolts screwing from outside into the threaded perforations and surrounding the bolts secured to the bearing, said sleeve bolts serving as abutments for the adjustable bearing and nuts screwing on the ends of the bolts passing through the sleeve bolts.

10. In an engine having a grid slide valve working in an inclosed chamber, the combination with said slide valve of an adjustable back bearing, a series of bolts secured to said bearing and extending from the valve inclosing chamber through the outer wall thereof, said bolts having shoulders formed on them and their outer ends threaded, a series of threaded perforations formed in the outer wall of the valve inclosing chamber through which the bolt ends aforesaid pass loosely, a series of sleeve bolts screwing from outside into the threaded perforations and surrounding and abutting against the shoulders of the bolts secured to the bearing, and nuts screwing on the ends of the bolts passing through the sleeve bolts.

11. In an engine having a grid slide valve working in an inclosed chamber, the combination with said slide valve of an adjustable back bearing, also situated in the chamber inclosing the valve, and means for adjusting said back bearing and locking it in fixed position, said means connecting therewith in the chamber, extending through the outer wall of said chamber, and operated through portions thereof accessible from the outside of said wall.

12. In an engine having a grid slide valve working in an inclosed chamber, the combination of an adjustable back bearing for the slide valve also situated in said chamber, a removable cover for the chamber closing an opening directly opposite the valve and bearing and formed with a series of threaded perforations, bolts secured to the back of the bearing and extending through the perforations in the cover, sleeve bolts extending through said perforations and serving as abutments for the back bearing, and nuts screwing on the ends of the bolts secured to the bearing and against the heads of the sleeve bolts.

13. In an engine having a grid slide valve working in an inclosed chamber, the combination of an adjustable back bearing for the slide valve also situated in said chamber, a removable cover for the chamber closing an opening directly opposite the valve and bearing and formed with a series of threaded perforations, and also with guides for the bearing, bolts secured to the back of the bearing and extending through the perforations in the cover, sleeve bolts screwing into said perforations and serving as abutments for the back bearing, and nuts screwing on the ends of the bolts secured to the bearing and against the heads of the sleeve bolts.

GUSTAV BERNHARD PETSCHE.

Witnesses:
JOSEPH F. O'NEILL,
D. STEWART.